United States Patent
Nayak et al.

(10) Patent No.: US 10,970,146 B2
(45) Date of Patent: Apr. 6, 2021

(54) ADAPTIVE FAULT PREDICTION ANALYSIS OF COMPUTING COMPONENTS

(71) Applicant: SEAGATE TECHNOLOGY LLC, Cupertino, CA (US)

(72) Inventors: Deepak Nayak, Mumbai (IN); Hemant Mohan, Pune (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 15/916,522

(22) Filed: Mar. 9, 2018

(65) Prior Publication Data

US 2019/0278648 A1    Sep. 12, 2019

(51) Int. Cl.
| | |
|---|---|
| *G06F 11/07* | (2006.01) |
| *G06F 11/00* | (2006.01) |
| *G06F 11/30* | (2006.01) |
| *G06F 11/34* | (2006.01) |

(52) U.S. Cl.
CPC ........ *G06F 11/0727* (2013.01); *G06F 11/008* (2013.01); *G06F 11/0754* (2013.01); *G06F 11/0793* (2013.01); *G06F 11/3034* (2013.01); *G06F 11/3058* (2013.01); *G06F 11/3452* (2013.01)

(58) Field of Classification Search
CPC ............. G06F 11/0727; G06F 11/0793; G06F 11/3034; G06F 11/0754; G06F 11/3058; G06F 11/008; G06F 11/3452

USPC .......................................................... 714/42
See application file for complete search history.

(56) References Cited

U.S. PATENT DOCUMENTS

| | | | |
|---|---|---|---|
| 6,714,893 B2 | 3/2004 | Busche et al. | |
| 7,198,964 B1 | 4/2007 | Cherry et al. | |
| 2008/0141072 A1 | 6/2008 | Kalgren et al. | |
| 2012/0284296 A1* | 11/2012 | Arifuddin | H04L 67/1027 707/769 |
| 2016/0147583 A1* | 5/2016 | Ben Simhon | G06F 11/076 714/47.3 |
| 2018/0227361 A1* | 8/2018 | Tao | H04L 67/1029 |
| 2018/0247239 A1* | 8/2018 | Horrell | G06F 11/008 |

* cited by examiner

*Primary Examiner* — Yair Leibovich
(74) *Attorney, Agent, or Firm* — Holzer Patel Drennan

(57) ABSTRACT

Systems and methods for adaptive fault prediction analysis are described. In one embodiment, the system includes one or more computing components, and one or more hardware controllers. In some embodiments, the storage system includes a storage drive. At least one of the one or more hardware controllers is configured to analyze one or more tolerance limits of a first computing component among the plurality of computing components; calculate a failure metric of the first computing component based at least in part on the analysis of the one or more tolerance limits of the first computing component; analyze sensor data from the first computing component in real time; and update the failure metric based at least in part on the analyzing of the sensor data.

20 Claims, 7 Drawing Sheets

ADAPTIVE FAULT PREDICTION ANALYSIS OF COMPUTING COMPONENTS

SUMMARY

The present disclosure is directed to methods and systems for adaptive fault prediction analysis. In some embodiments, the present systems and methods may perform adaptive fault prediction analysis for one or more computing components.

A system for adaptive fault prediction analysis is described. In one embodiment, the system may include one or more computing components, and one or more hardware controllers. In some embodiments, the system may include a storage drive. At least one of the one or more hardware controllers may be configured to analyze one or more tolerance limits of a first computing component among the plurality of computing components; calculate a failure metric of the first computing component based at least in part on the analysis of the one or more tolerance limits of the first computing component; analyze sensor data from the first computing component in real time; and update the failure metric based at least in part on the analyzing of the sensor data.

In some embodiments, the hardware controller may be configured to detect a failure of a second computing component among the plurality of computing components. In some embodiments, the hardware controller may be configured to identify a location of the first computing component relative to a location of the second computing component.

In some embodiments, the hardware controller may be configured to determine whether the location of the first computing component relative to the location of the second computing component satisfies a location threshold. In some embodiments, the hardware controller may be configured to update the failure metric of the first computing component based at least in part on how near the first computing component is located relative to the second computing component.

Upon determining the first computing component is located directly adjacent to the second computing component, the hardware controller may update the failure metric of the first computing component a maximum amount allowed for failure in an adjacent component. In some embodiments, the hardware controller may be configured to update the failure metric of the first computing component by an amount determined based at least in part on a component type associated with the first component, a component type associated with the second component, or both.

In some cases, the one or more tolerance limits of the first computing component may include at least one of component age, lifetime utilization, accumulated operations, real-time component temperature, component temperature history, real-time component vibration, component vibration history, real-time component electrical current, history of component electrical current, real-time component electrical voltage, history of component electrical voltage, or any combination thereof.

In some cases, the sensor data of the first computing component may include at least one of an indication of an uncorrectable error, a command timeout, a read or write error of a solid state drive, a read or write error of non-volatile memory device, a reallocated sector count, a current pending sector count, an offline uncorrectable sector count, or any combination thereof.

In some cases, analysis of the one or more tolerance limits of the first computing component may include using machine learning to process the one or more tolerance limits of the first computing component. In some cases, the first computing component may include at least one of a storage drive, a storage drive within a storage enclosure enclosing multiple storage drives, one or more main memory modules, one or more processors, or any combination thereof.

An apparatus for adaptive fault prediction analysis is also described. In one embodiment, the apparatus may include a processor, memory in electronic communication with the processor, and instructions stored in the memory, the instructions being executable by the processor to analyze one or more tolerance limits of a first computing component among the plurality of computing components; calculate a failure metric of the first computing component based at least in part on the analysis of the one or more tolerance limits of the first computing component; analyze sensor data from the first computing component in real time; and update the failure metric based at least in part on the analyzing of the sensor data.

A method for adaptive fault prediction analysis is also described. In one embodiment, the method may include analyzing one or more tolerance limits of a first computing component among the plurality of computing components; calculating a failure metric of the first computing component based at least in part on the analysis of the one or more tolerance limits of the first computing component; analyzing sensor data from the first computing component in real time; and updating the failure metric based at least in part on the analyzing of the sensor data.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
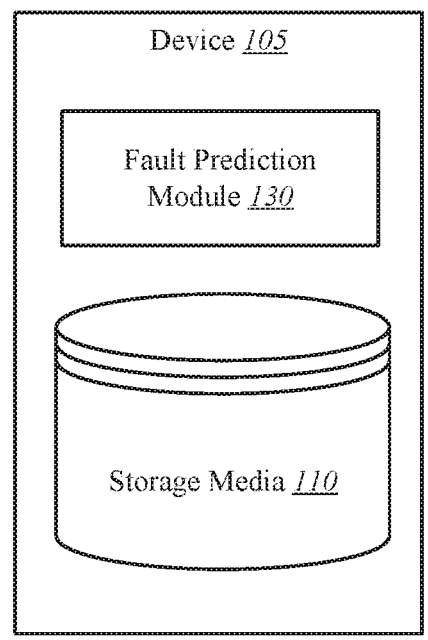
FIG. 1 is a block diagram of an example of a system in accordance with various embodiments.

The following relates generally to adaptive fault prediction analysis. In one embodiment, the present systems and methods may include an adaptive method to predict failures of computing components such as storage drives, processors, memory modules, etc., installed in computing devices and/or computing systems such as storage systems. Conventional systems predict component failure by only querying a component on a periodic basis. However, the conventional methods inaccurately model and/or predict component failure. Accordingly, a need exists to improve the accuracy of predicting component failure, as the accuracy of such predictions affects warranty and spare unit strategies, and ultimately, a bottom-line of certain components.

The present systems and methods include an adaptive, multi-pronged and multi-dimensional approach to predicting component failure. The present systems and methods include additional sources of data that the conventional methods do not consider. Also, the present systems and methods perform a time-based and/or incident-based analysis as well as spatial or n-dimensional analysis, where n may be one or more dimensions. Additionally, the present systems and methods may include use of at least one of machine learning, deep learning, analytics, or any combination thereof to learn prediction indicators over time, and evolve with incoming data.

In one embodiment, the present systems and methods implements a three-stage decision engine to generate, modify, update, and output a failure metric for each monitored component. The present systems and methods may include using the failure metrics as inputs to an input/output (I/O) stack running on a failure prediction analysis engine. In some embodiments, the failure prediction analysis engine may include tuneable, learning-based algorithms running on the I/O stack. In some cases, the failure prediction analysis engine may include and/or operate in conjunction with a management controller (MC), storage controller (SC), and/or host system associated with the monitored components. Additionally or alternatively, the failure prediction analysis engine may include and/or operate in conjunction with an enclosure management subsystem (EMS) control process executed by a storage enclosure processor (SEP) and/or expander backplane (e.g., microcontroller on a backplane of a storage enclosure). In some cases, the failure prediction analysis engine may be configured to take appropriate control and/or preventive management actions.

The benefits of the present systems and methods include increased component and system reliability, reduced bottom-line costs for components and systems containing the components, reduced warranty claims against components and systems affected by component failures, and optimized over-provisioning of computer related components including but not limited to storage-based components.

In some cases, the failure prediction analysis engine may include an input block, a three-stage decision engine block, and an output block. In some cases, the failure prediction analysis engine may apply a predetermined weight to one or more inputs received at the input block. In some cases, the failure prediction analysis engine may apply a predetermined weight to an input based at least in part on the type of input. In some cases, the inputs may be referred to collectively as tolerance limits.

In some embodiments, the one or more inputs may include knowledge base data. The knowledge base data may include a database of failure factors for each particular component based on component type. In some cases, the knowledge based data may be referred to as failure factors. As one example, failure factors of a storage-based component may include at least one of component age (e.g., a manufacturing date retrieved from component firmware), component lifetime utilization (e.g., accumulated operations such as read/writes of a storage-based component), component operational environment (e.g., tolerance limits associated with component temperature, component vibration, component electrical current, component electrical voltage, etc.), component mean time before failure, component annualized failure rate, or any combination thereof.

In some cases, the failure factors may include data or device status information obtained from monitoring the component. For example, with storage-based components the failure factors may include at least one of reallocated sector count; reported uncorrectable errors; command timeout; current pending sector count; offline uncorrectable sector count; or any combination thereof. In some cases, the failure factors may include enclosure data from enclosure management sub-system (EMS). The EMS data may include at least one of topological data, mechanical data, or electrical data, or any combination thereof. The topological data may include disk-to-bay-slot mappings, 2D spatial location of storage drives in an enclosure, etc. The mechanical data may include zone-wise temperatures (e.g., zone-wise temperatures of disk-bay-slots), airflow (e.g., pulse code modulation of fan speed readings, etc.), component vibration readings, and so forth. The electrical data may include enclosure rail voltages, enclosure rail currents, storage drive voltages, storage drive currents, etc.

In one embodiment, the failure factor inputs may be analyzed by the failure prediction analysis engine. In some cases, the failure prediction analysis engine may output a performance failure rank (PFR). The PFR may also be referred to as a failure metric. In some cases, the failure prediction analysis engine may generate a PFR for each monitored component. In some embodiments, the PFR may be graded on a scale such as from 1 to 10. In one example, a PFR of 1 may indicate a lowest chance of failure, and a PFR of 10 may indicate a highest chance of failure. A PFR in the range from 7 to 10 may be considered a high PFR; a PFR in the range from 4 to 6 may be considered a medium PFR; and a PFR from 1 to 3 may be considered a low PFR. Alternatively, a PFR of 1 may indicate a highest chance of failure, and a PFR of 10 may indicate a lowest chance of failure.

In one example, the failure prediction analysis engine may compute a PFR for each monitored component using failure factors as inputs. In some cases, at least one of the failure factors is associated with a predetermined threshold. In some embodiments, the failure prediction analysis engine may update or modify at least one of the PFRs in real time based at least in part on predetermined weighted combinations of failure attributes including but not limited to sensor data (e.g., sensor data from sensors associated with the monitored components, EMS data, etc.). In some cases, the PFRs, including updated and non-updated PFRs, may be used as soft/hard threshold inputs to the I/O stack of the failure prediction analysis engine. In some cases, the I/O stack may use various component utilization and/or data-placement decisions based on the PFR values. In one example, a relatively high PFR for a particular component may result in the present systems and methods being instructed by the failure prediction analysis engine to utilize the particular component less than normally due to the perceived failure risk. In another example, a high or medium PFR of a storage component (e.g., a storage drive) may trigger firmware of the storage component to prioritize an unstable sector remapping. In another example, the failure prediction analysis engine may instruct EMS to offline a component with a relatively high PFR. In another example, the failure prediction analysis engine may instruct EMS to implement a remanufacturing or factory resetting of a component with a relatively high PFR.

In one embodiment, the failure prediction analysis engine may correlate a component's PFR with environmental data from a spatial zone and/or relative location associated with a particular component and other components. When a component is flagged with a relatively high PFR, the failure factors, sensor data, and/or EMS data may indicate an association with environmental factors in the failing or predicted failing of the component. As a result, the relatively high PFR of the component may indicate a risk of failure among neighbouring components. In one embodiment, the failure prediction analysis engine may generate a risk neighbourhood of the high-PFR component. In some cases, the risk neighbourhood may include an n-dimensional risk neighbourhood, where n may be 1 or more dimensions. In some cases, a radius or extent of the risk-neighbourhood may be proportional (e.g., linearly proportional, non-linearly proportional, log-linearly proportional, etc.) to the high-PFR component.

In some cases, the failure prediction analysis engine may take remedial measures for the components within the risk neighbourhood, by adjusting the respective PFRs by a predetermined amount (e.g., a percentage adjustment of the component's current PFR, a predetermined fixed amount adjustment, etc.). In one example, the PFRs of components within the risk neighbourhood may be adjusted according to a PFR-adjustment-delta. In some cases, the PFR-adjustment-delta may include a bell-shaped curve with regards to the radial proximity between the high-PFR component and components within the risk neighbourhood where the closer the component the greater the adjustment. Additionally or alternatively, the PFR-adjustment-delta may include a Gaussian fall-off with regards to the radial proximity between the high-PFR component and components within the risk neighbourhood. In one example, the failure prediction analysis engine may instruct EMS to take appropriate actions and/or decisions to address the high environmental-based PFRs such as but not limited to increasing a fan speed, controlled spin-down, proportionately decreasing or limiting use of computing components.

In one embodiment, the failure prediction analysis engine continually updates individual PFRs as well as associated risk neighbourhoods based on input data (e.g., failure factors, time data, incident data, sensor data, spatial data, etc.). In some cases, calculated PFR values may be used as soft/hard threshold inputs to the I/O stack in the failure prediction analysis. Thus, calculated PFR values may be used as in a feedback loop to further enhance the calculation of PFR values.

In one embodiment, a first stage may include taking in failure factors as input. In some cases, the input may include knowledge base information (e.g., tolerances of components provided by component vendors, etc.). The input data may include monitored component data and current status of the monitored components (e.g., component age, operation counts for a given component, current component temperature, etc.). In some cases, the collected inputs may be analyzed. The analysis may include passing the information through a decision tree such as but not limited to a classification tree, a regression tree, a boosted decision tree, or any combination thereof. The decision tree may implement a tree-like graph, which implements conditional control statements suitable for mapping the knowledge base onto a flowchart-like structure.

A second stage of the present systems and methods takes in current device conditions and/or EMS data as inputs. The PFRs may be updated based on analysis of the current device conditions and/or EMS data. In some cases, the current device conditions and/or EMS data may be analyzed using a directed acyclic graph (DAG) such as but not limited to a probabilistic Bayesian Network, a Markov network, another similar structured learning model, or any combination thereof. The second stage may be configured to update a belief/confidence in the calculated PFRs based on periodic inputs and event occurrences.

A third stage of the present systems and methods includes correlating high PFRs of failed/failing components from the second stage with environmental data (e.g., EMS data) to build a n-dimensional risk neighbourhood, where n may be one or more. The third stage may use reinforcement learning to analyze data (e.g., environmental data, existing PFRs, etc.). In some cases, the third stage may include multiple "agents" that take one or more actions. In some cases, these actions may affect/maximize a cumulative reward system, and hence may map naturally to a group/cluster of adjacent components surrounding a failed/failing component.

FIG. 1 is a block diagram illustrating one embodiment of an environment 100 in which the present systems and methods may be implemented. The environment may include device 105 and storage media 110. The storage media 110 may include any combination of hard disk drives, solid state drives, and hybrid drives that include both hard disk and solid state drives. In some embodiment, the storage media 110 may include shingled magnetic recording (SMR) storage drives. In some embodiments, the systems and methods described herein may be performed on a single device such as device 105. In some cases, the methods described herein may be performed on multiple storage devices or a network of storage devices such a cloud storage system and/or a distributed storage system. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include fault prediction module 130. In one example, the device 105 may be coupled to storage media 110. In some embodiments, device 105 and storage media 110 may be components of flash memory or a solid state drive and/or another type of storage drive. Alternatively, device 105 may be a component of a host of the storage media 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage media 110 may include a database. Additionally, or alternatively, device 105 may include a wired and/or a wireless connection to an external database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage media 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 4G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage media 110 may be internal to device 105. As one example, device 105 may include a storage controller that interfaces with storage media of storage media 110. Fault prediction module 130 may predict a failure of computing components such as one of one or more hardware controllers, one or more processors, one or more main memory modules, one or more storage drives, one or more storage enclosure components (e.g., microcontrollers, processors, memory, power supply units, enclosure management modules, cooling fans, backplane connectors, backplane components, etc.), or any combination thereof.

Figure 2:
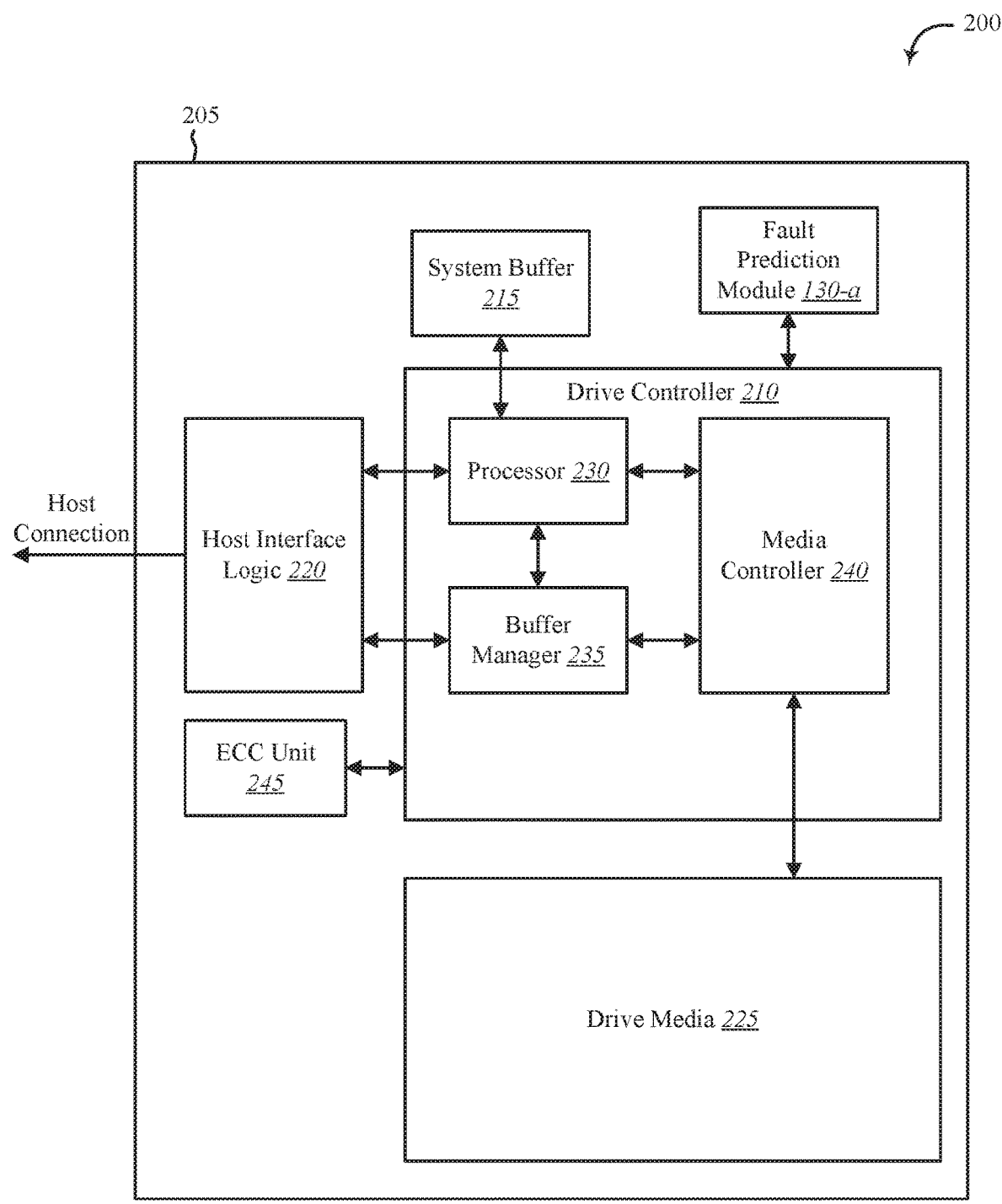
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, and fault prediction module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The drive controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, ECC unit 245 may perform error correction on data stored in drive media 225.

In some embodiments, fault prediction module 130-a may include at least one of one or more processors, one or more memory devices, one or more storage devices, instructions executable by one or more processors stored in one or more memory devices and/or storage devices, or any combination thereof. Although depicted outside of drive controller 210, in some embodiments, fault prediction module 130-a may include software, firmware, and/or hardware located within drive controller 210 and/or operated in conjunction with drive controller 210. For example, fault prediction module 130-a may include at least a portion of processor 230, buffer manager 235, and/or media controller 240. In one example, fault prediction module 130-a may include one or more instructions executed by processor 230, buffer manager 235, and/or media controller 240.

Figure 3:
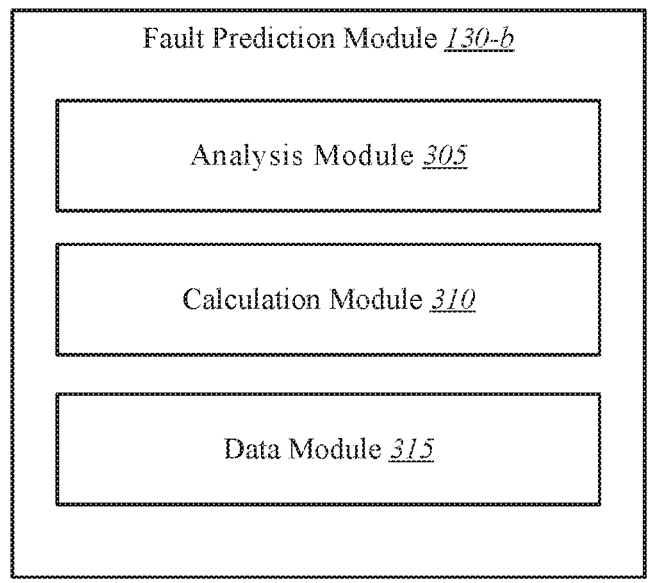
FIG. 3 shows a block diagram of one or more modules in accordance with various aspects of this disclosure.

FIG. 3 shows a block diagram of fault prediction module 130-b. The fault prediction module 130-b may include one or more processors, memory, and/or one or more storage devices. The fault prediction module 130-b may include analysis module 305, calculation module 310, and data module 315. The fault prediction module 130-b may be one example of fault prediction module 130 of FIGS. 1 and/or 2. Each of these components may be in communication with each other.

In one embodiment, failure prediction module 130-b may be configured to predict the failure of one or more computing components. In one embodiment, failure prediction module 130-b may be part of a storage system. The storage system may include a plurality of computing components and a hardware controller. In some cases, the plurality of computing components may include the hardware controller. Additionally or alternatively, the plurality of computing components may include at least one of one or more hardware controllers, one or more processors, one or more main memory modules, one or more storage drives, one or more storage enclosure components (e.g., microcontrollers, processors, memory, power supply units, enclosure management modules, cooling fans, backplane connectors, backplane components, etc.), or any combination thereof.

In some embodiments, the hardware controller may include one or more storage controllers in a storage drive, one or more storage controllers in a storage server, one or more storage controllers in a storage enclosure, or any combination thereof. In some cases, the hardware controller may include one or more processors of a host associated with a computing system and/or storage system. In some examples, the host may include a hardware machine host such as a server, desktop computer, laptop, mobile computing device, etc., or a software machine host such as a Virtual Machine (VM), a container, or some similar software containerization platform. Additionally or alternatively, the host may include an operating system and/or firmware code.

In one embodiment, analysis module 305 may be configured to analyze one or more tolerance limits of a first computing component among the plurality of computing components. In one embodiment, calculation module 310 may be configured to calculate a failure metric of the first computing component based at least in part on the analysis of the one or more tolerance limits of the first computing component by analysis module 305. In some cases, the first computing component includes at least one of a storage drive in a computing device such as a storage server, a storage drive within a storage enclosure enclosing multiple storage drives, one or more main memory modules, one or more processors, or any combination thereof. In some cases, the plurality of computing components may be components of a storage server, components of a storage enclosure, components of a host machine of the storage enclosure, or any combination thereof.

In some cases, the one or more tolerance limits of the first computing component may include at least one of component age, lifetime utilization, accumulated operations, real-time component temperature, component temperature history, real-time component vibration, component vibration history, real-time component electrical current, history of component electrical current, real-time component electrical voltage, history of component electrical voltage, or any combination thereof. The lifetime utilization and/or accumulated operations may include accumulated data read and/or data writes over a lifetime of a storage drive. In some cases, component electrical current may be an electrical current supplied to at least one of the computing components, an electrical current stored by at least one of the computing components, an electrical current generated by at least one of the computing components, or any combination thereof.

In some cases, analysis of the one or more tolerance limits of the first computing component may include using machine learning to process the one or more tolerance limits of the first computing component. In some cases, using the machine learning may include using a decision tree or boosted decision tree to analyze the one or more tolerance limits of the first computing component.

In some embodiments, analysis module 305 may be configured to analyze sensor data from the first computing component in real time. In one embodiment, data module 315 may be configured to update the failure metric based at least in part on the analyzing of the sensor data by the analysis module 305.

In some cases, the failure attributes such as but not limited to sensor data of the first computing component may include at least one of an indication of an uncorrectable error, an error in a solid state drive or non-volatile memory device (e.g., write error, read error, flash memory error, etc.), a command timeout, a reallocated sector count, a current pending sector count, an offline uncorrectable sector count, or any combination thereof.

In one embodiment, analysis module 305 may be configured to detect a failure of a second computing component among the plurality of computing components. In some embodiments, analysis module 305 may be configured to identify a location of the first computing component relative to a location of the second computing component. For example, the first and second computing components may be located in the same enclosure (e.g., computing components in a storage enclosure, computing components in a server enclosure, computing components in a desktop enclosure, etc.).

In some embodiments, analysis module 305 may be configured to determine whether the location of the first computing component relative to the location of the second computing component satisfies a location threshold. In some examples, data module 315 may be configured to update the failure metric of the first computing component based at least in part on how near the first computing component is located relative to the second computing component. In some embodiments, upon analysis module 305 determining the first computing component is located directly adjacent to the second computing component, data module 315 may be configured to update the failure metric of the first computing component a maximum amount allowed for failure in an adjacent component. For example, when the second computing component is directly adjacent to the first computing component (e.g., no component between the first and second computing components), then the failure metric of the first computing component may be adjusted by a maximum amount; two away by an amount less than the maximum amount, and so forth. As one example, when the first computing component is directly adjacent to the second computing component the failure metric of the first computing component may be adjusted by 10% (e.g., 10% increment or 10% decrement of failure metric); when the first computing component is two away from the second computing component (e.g., a third computing component between the first and second computing components) then the failure metric of the first computing component may be adjusted by 5%; when the first computing component is three away from the second computing component (e.g., third and fourth computing components between the first and second computing components) then the failure metric of the first computing component may be adjusted by 1%; when the first computing component is four away from the second computing component (e.g., third, fourth, and fifth computing component between the first and second computing components) then the failure metric of the first computing component may be adjusted by 0%, etc. In some cases, the failure metric may be adjusted by a fixed amount (e.g., 3 point adjustment for directly adjacent, 2 point adjustment for two away, 1 point adjustment for three away, etc.).

In some embodiments, data module 315 may be configured to update the failure metric of the first computing component by an amount determined based at least in part on a component type associated with the first component, a component type associated with the second component, or both.

Figure 4:
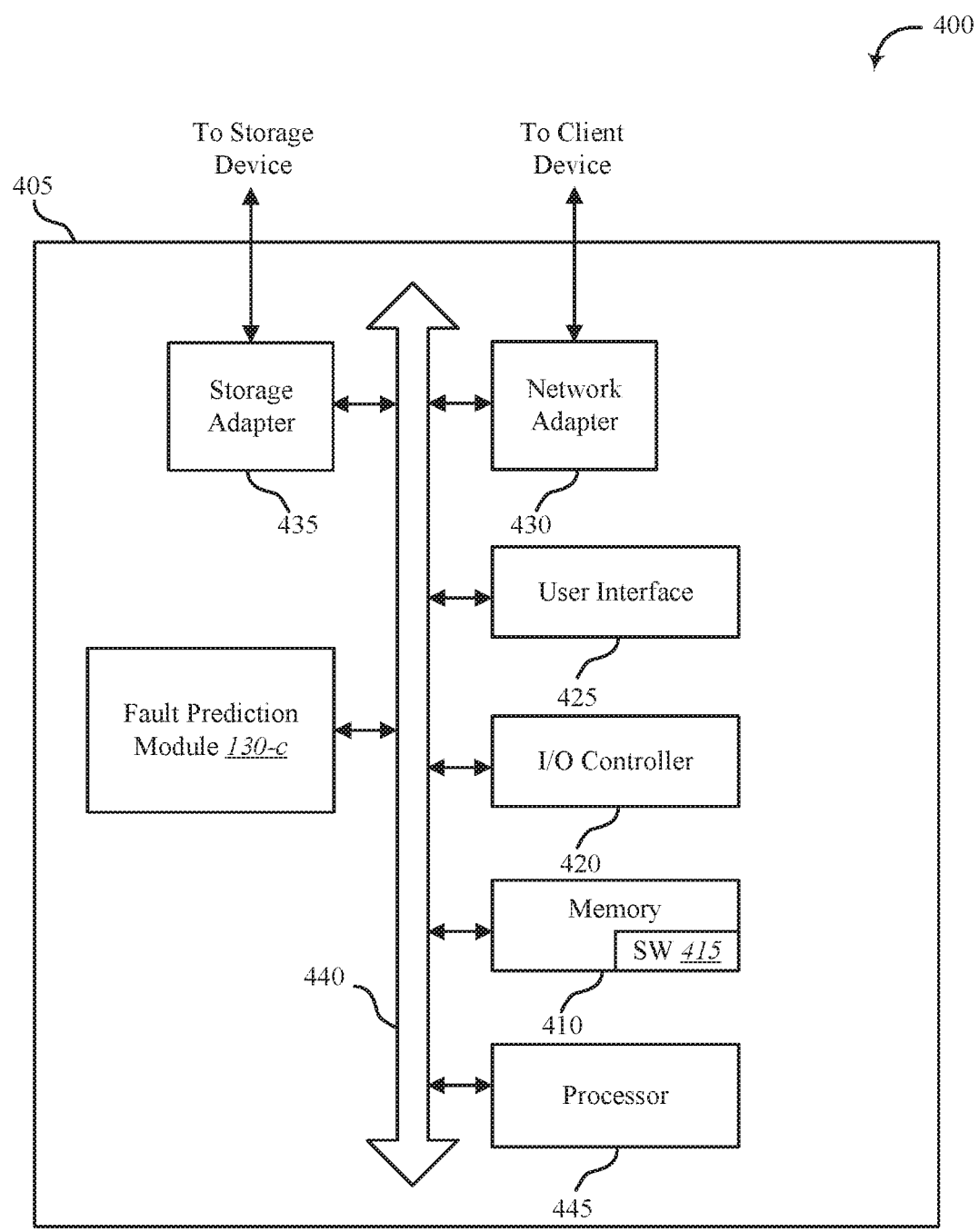
FIG. 4 shows a diagram of a system in accordance with various aspects of this disclosure.

FIG. 4 shows a system 400 for adaptive fault prediction analysis, in accordance with various examples. System 400 may include an apparatus 405, which may be an example of any one of device 105 of FIG. 1 and/or apparatus 205 of FIG. 2.

Apparatus 405 may include components for bi-directional voice and/or data communications including components for transmitting communications and components for receiving communications. For example, apparatus 405 may communicate bi-directionally with one or more storage devices and/or client systems. This bi-directional communication may be direct (apparatus 405 communicating directly with a storage system, for example) and/or indirect (apparatus 405 communicating indirectly with a client device through a server, for example).

Apparatus 405 may also include a processor module 445, and memory 410 (including software/firmware code (SW) 415), an input/output controller module 420, a user interface module 425, a network adapter 430, and a storage adapter 435. The software/firmware code 415 may be one example of a software application executing on apparatus 405. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 405 may provide a connection using wireless techniques, including digital cellular telephone connection, Cellular Digital Packet Data (CDPD) connection, digital satellite data connection, and/or another connection. The apparatus 405 may include fault prediction module 130-*c*, which may perform the functions described above for the fault prediction module 130 of FIGS. 1, 2, and/or 3.

The signals associated with system 400 may include wireless communication signals such as radio frequency, electromagnetics, local area network (LAN), wide area network (WAN), virtual private network (VPN), wired network (such as but not limited to 802.3, etc.), wireless network (e.g., such as but not limited to 802.11, 802.15, etc.), cellular network (using any combination of 2G, 3G, long term evolution (LTE), 5G and/or any other available wireless standard, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 405 such as processor module 445, memory 410, I/O controller module 420, user interface module 425, network adapter 430, and storage adapter 435, or any combination thereof.

The memory 410 may include random access memory (RAM), read only memory (ROM), flash memory, electrically erasable ROM (EEPROM), non-volatile dual in-line memory module (NVDIMMs), and/or other memory types. The memory 410 may store computer-readable, computer-executable software/firmware code 415 including instructions that, when executed, cause the processor module 445 to perform various functions described in this disclosure. Alternatively, the software/firmware code 415 may not be directly executable by the processor module 445 but may cause a computer (when compiled and executed, for example) to perform functions described herein. Alternatively, the computer-readable, computer-executable software/firmware code 415 may not be directly executable by the processor module 445, but may be configured to cause a computer, when compiled and executed, to perform functions described herein. The processor module 445 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the fault prediction module 130-*c* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cellular radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operating system, a desktop/laptop operating system, a Real Time Operating System (RTOS), or another known operating system.

The I/O controller module 420 may operate in conjunction with network adapter 430 and/or storage adapter 435. The network adapter 430 may enable apparatus 405 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 405 to access one or more data storage devices such as storage device 110. The one or more data storage devices may include two or more data tiers each. The storage adapter 435 may include one or more of an Ethernet adapter, a Fibre Channel adapter, Fibre Channel Protocol (FCP) adapter, a SCSI adapter, and iSCSI protocol adapter.

Figure 5:
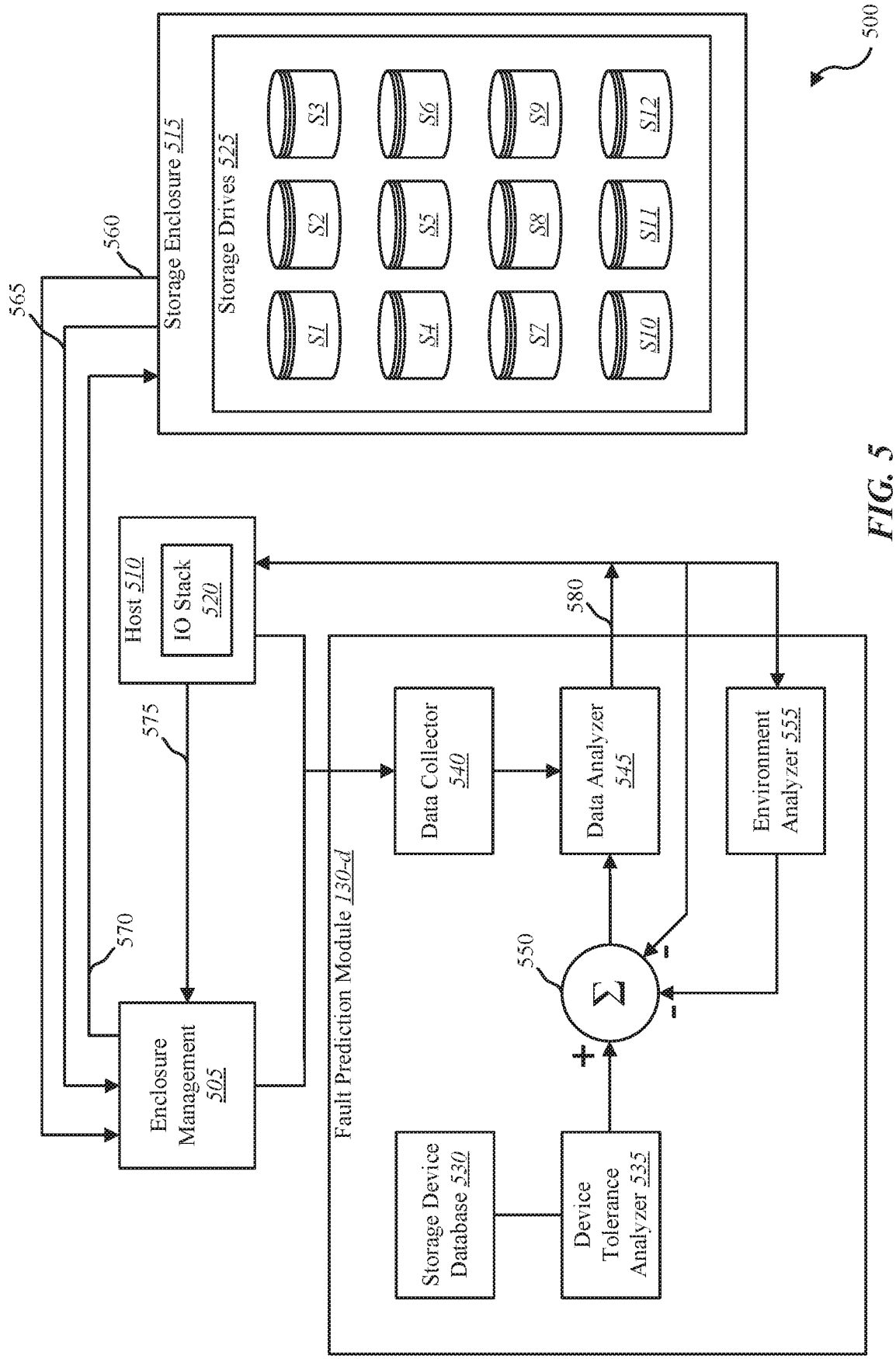
FIG. 5 shows one embodiment of an environment in accordance with various aspects of this disclosure.

FIG. 5 shows an environment 500 for adaptive fault prediction analysis, in accordance with various examples. At least one aspect of environment 500 may be implemented in conjunction with device 105 of FIG. 1, apparatus 205 of FIG. 2, and/or fault prediction module 130 depicted in FIGS. 1, 2, 3, and/or 4.

As depicted, environment 500 may include enclosure management sub-system 505, host 510, storage enclosure 515, and fault prediction module 130-*d*. As shown, host 510 may include I/O stack 520. As illustrated, storage enclosure 515 may include storage drives 525. As shown, storage drives 525 may include storage drives S1 to S12 as one example. Although environment 500 shows storage drives S1 to S12, it is understood that storage drive 525 may include less or more storage drives than the number shown. As illustrated, fault prediction module 130-*d* may include storage device database 530, device tolerance analyzer 535, data collector 540, data analyzer 545, accumulator 550, and environment analyzer 555.

In one embodiment, any one or a combination of the operations described with relation to environment 500 may be performed by or in conjunction with one or more processors and/or controllers of at least one of host 510, storage enclosure 515, storage drives 525, or any combination thereof.

In some cases, enclosure management sub-system 505 and/or fault prediction module 130-d may be part of host 510. Host 510 may include at least one of a computing device, a memory device, mobile computing device, storage server, operating system, or any combination thereof.

In some embodiments, host 510 may be a host of storage enclosure 515. In one embodiment, host 510 may include at least one of a management controller to manage storage enclosure 515 and/or one or more of storage drives 525, a storage controller to control storage enclosure 515 and/or one or more of storage drives 525, a host machine of storage enclosure 515 and/or one or more of storage drives 525, a host operating system of storage enclosure 515 and/or one or more of storage drives 525, or any combination thereof.

In one embodiment, storage device database 530 may include a database of information about one or more monitored components. The one or more monitored components may include storage enclosure 515 and/or storage drives 525. In some embodiments, the information stored in storage device database 530 may include tolerance limits of one or more monitored components. In some cases, the one or more tolerance limits stored in storage device database 530 may include at least one of component age, lifetime utilization, accumulated operations, real-time component temperature, component temperature history, real-time component vibration, component vibration history, real-time component electrical current, history of component electrical current, real-time component electrical voltage, history of component electrical voltage, or any combination thereof.

In one embodiment, device tolerance analyzer 535 may analyze the tolerance limits stored in storage device database 530 in conjunction with the monitoring of the one or more components. In some cases, device tolerance analyzer 535 may query a component or information stored about a component and then compare information resulting from the query with device information stored in storage device database 530. In some cases, device tolerance analyzer 535 may provide one or more analysis results to accumulator 550.

In one embodiment, data collector 540 may collect data from enclosure management sub-system 505 and/or host 510. In some cases, data collector 540 may provide the data collected from enclosure management sub-system 505 and/or host 510 to data analyzer 545. In one example, data collector 540 may collect failure factors, sensor data, and/or EMS data from enclosure management sub-system 505 and/or host 510. As shown, storage enclosure 515 may send sensor data 560 to enclosure management sub-system 505. Additionally or alternatively, storage enclosure 515 may send device status information 565 and related failure factors obtained from monitoring the component.

In one embodiment, inputs to data analyzer 545 may include an output from data collector 540 and/or an output from accumulator 550. In one embodiment, environment analyzer 555 may analyze environmental information associated with the one or more monitored components. The environmental information may include a location of a first component and a location of a second component relative to the location of the first component. In some cases, the environmental information may include component temperature, component vibration, component electrical current, electrical voltage, etc. In some cases, the environment information may include a temperature of a zone, where the zone includes two or more components in the same system.

In some embodiments, inputs to accumulator 550 may include at least one of analysis results from device tolerance analyzer 535, analysis results from environment analyzer 555, or analysis results from data analyzer 545, or any combination thereof. Data analyzer 545 may receive an output from accumulator 550 and generate failure metrics 580 (e.g., performance failure rankings (PFRs)) based on the information received from accumulator 550. In one embodiment, host 510 may receive the failure metrics 580 and modify the operation of storage enclosure 515 based on the received failure metrics 580. As shown, enclosure management sub-system 505 may send EMS triggers 570 to storage enclosure 515. As illustrated, host 510 may send one or more control signals 575 to enclosure management sub-system 505. In one example, host 510 may receive failure metrics 580 from data analyzer 545, generate a control signal 575 based on the received failure metrics 580. Enclosure management sub-system 505 may then generate a command and send the command as a EMS trigger 570 to storage enclosure 515 instructing storage enclosure 515 to modify the operation of one or more of the storage drives 525.

In one embodiment, accumulator 550 may receive failure metrics 580 as an input. Accordingly, data analyzer 545 may receive the accumulated information from accumulator 550, which may include a feedback loop of failure metrics 580 from data analyzer 545. In some cases, data analyzer 545 may update the information in failure metrics 580 (e.g., update the PFRs) based on the feedback loop of failure metrics 580 inputted to accumulator 550. In some embodiments, accumulator may sum inputs received from device tolerance analyzer 535, environment analyzer 555, and/or failure metrics 580 fed back to accumulator 550 from data analyzer 545. As shown, with the summing of inputs accumulator 550 may treat an input from device tolerance analyzer 535 as a positive input, an input from environment analyzer 555 as a negative input, and failure metrics 580 fed back to accumulator 550 from data analyzer 545 as a negative input.

In some embodiments, data analyzer 545 may update one or more PFRs in failure metrics 580 based on environmental information regarding storage drives 525. For example, when fault prediction module 130-d determines that storage drive S2 has failed, then data analyzer 545 may update the PFR for storage drive S2. Additionally or alternatively, fault prediction module 130-d may update the PFRs for one or more storage drives adjacent or relatively near storage drive S2. For example, based on environmental information from environment analyzer 555, data analyzer 545 may determine that storage drives S1, S3, S4, S5, and S6 are adjacent to storage drive S2. As a result, data analyzer 545 may update the PFRs for S1, S3, S4, S5, and S6. In some cases, data analyzer 545 may determine that S1 and S3 are laterally adjacent to S2; determine that S5 is vertically adjacent to S2; and determine that S4 and S6 are diagonally adjacent to S2. Accordingly, data analyzer 545 may adjust the PFRs of S1 and S3 by a first value for being laterally adjacent; adjust PFRs of S5 by a second value for being vertically adjacent; and adjust PFRs of S4 and S6 by a third value for being diagonally adjacent, where the first, second, and third values differ from each other. Similarly, in some cases the PFRs of all two-away components (e.g., S8 where S5 is between S8 and S2) may be modified differently based on being laterally adjacent, vertically adjacent, or diagonally adjacent. Alternatively, the PFRs of all directly adjacent components (S1, S3, S4, S5, and S6) may be adjusted by a first amount whether the components are linearly adjacent, vertically adjacent or diagonally adjacent; and all two away components may be adjusted by a second amount different from the first amount whether the components are linearly adjacent, vertically adjacent or diagonally adjacent, and so forth.

Figure 6:
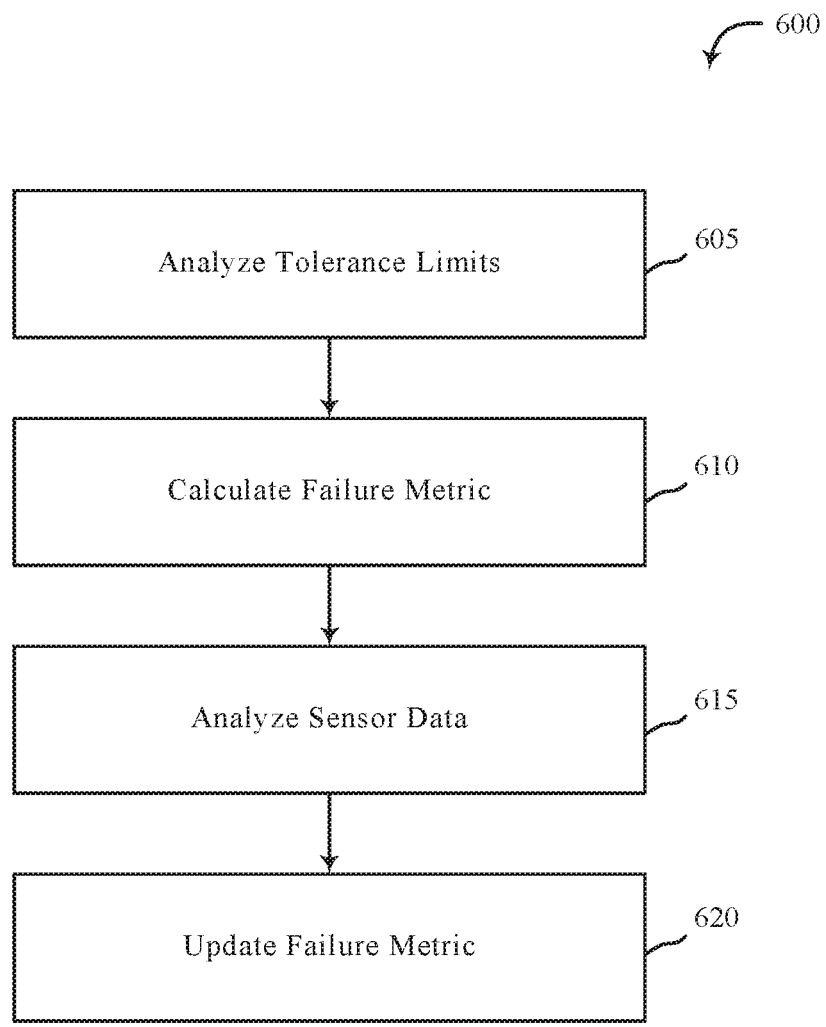
FIG. 6 is a flow chart illustrating an example of a method in accordance with various aspects of this disclosure.

FIG. 6 is a flow chart illustrating an example of a method 600 for adaptive fault prediction analysis, in accordance with various aspects of the present disclosure. One or more aspects of the method 600 may be implemented in conjunction with device 105 of FIG. 1, apparatus 205 of FIG. 2, and/or fault prediction module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, method 600 may include analyzing one or more tolerance limits of a first computing component among the plurality of computing components. At block 610, method 600 may include calculating a failure metric of the first computing component based at least in part on the analysis of the one or more tolerance limits of the first computing component. At block 615, method 600 may include analyzing sensor data from the first computing component in real time. At block 620, method 600 may include updating the failure metric based at least in part on the analyzing of the sensor data.

The operation(s) at block 605-620 may be performed using the fault prediction module 130 described with reference to FIGS. 1-4 and/or another module. Thus, the method 600 may provide for adaptive fault prediction analysis. It should be noted that the method 600 is just one implementation and that the operations of the method 600 may be rearranged, omitted, and/or otherwise modified such that other implementations are possible and contemplated.

Figure 7:
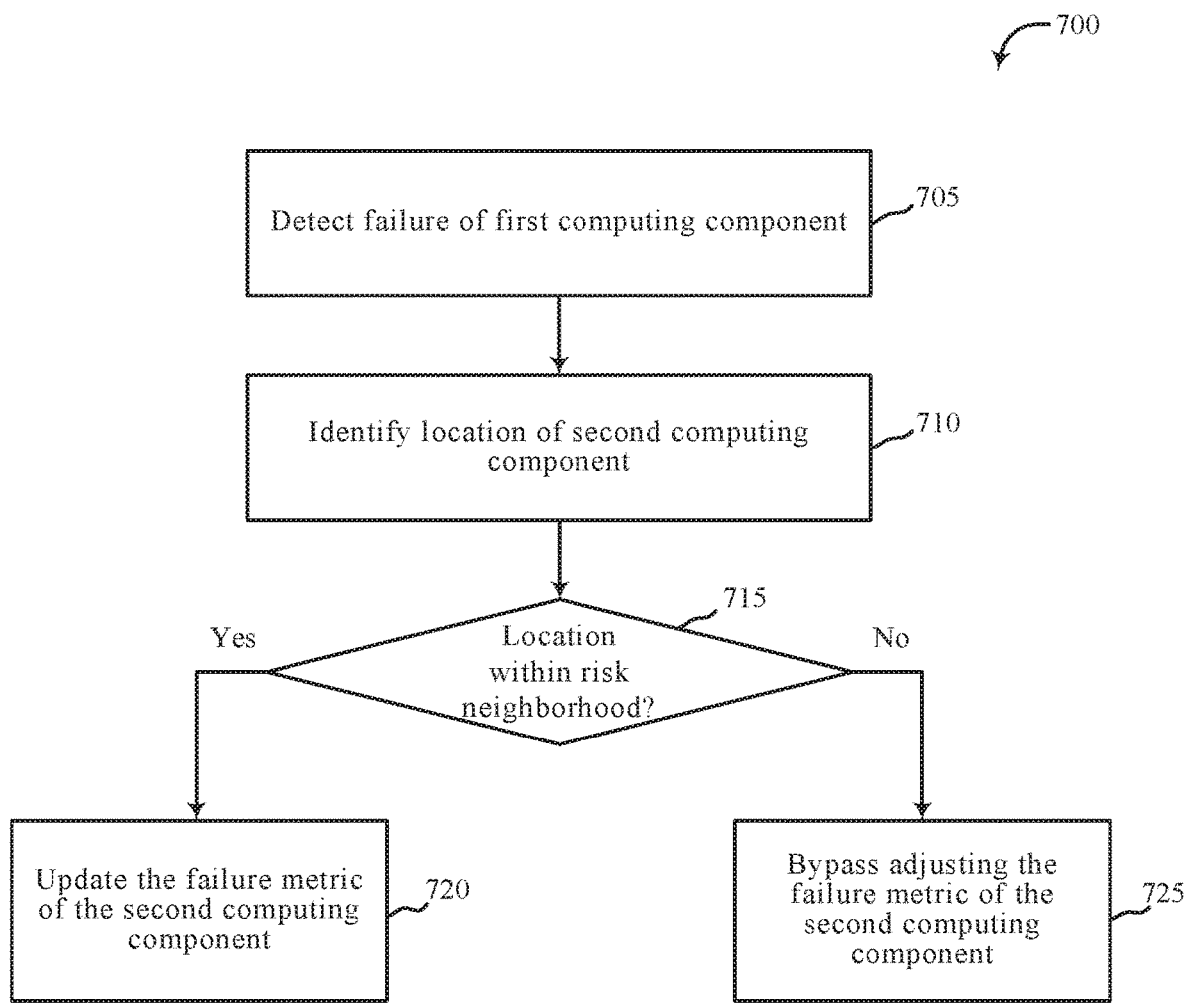
FIG. 7 is a flow chart illustrating an example of a method in accordance with various aspects of this disclosure.

FIG. 7 is a flow chart illustrating an example of a method 700 for adaptive fault prediction analysis, in accordance with various aspects of the present disclosure. One or more aspects of the method 700 may be implemented in conjunction with device 105 of FIG. 1, apparatus 205 of FIG. 2, and/or fault prediction module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 705, method 700 may include detecting a failure of a first computing component among a plurality of computing components. At block 710, method 700 may include identifying a location of a second computing component relative to a location of the first computing component.

At block 715, method 700 may include determining whether a location of the second computing component is within a risk neighborhood of the first computing component. For example, method 700 may determine whether the first computing component is within a predetermined distance of the second computing component.

Upon determining the location of the second computing component is within the risk neighborhood, at block 720 method 700 may include updating the failure metric of the second computing component based at least in part on how near the second computing component is located relative to the first computing component.

Upon determining the location of the second computing component is within the risk neighborhood, at block 725 method 700 may include bypassing adjustment of the failure metric of the second computing component based on the location of the second computing component relative to the first computing component.

The operations at blocks 705-725 may be performed using the fault prediction module 130 described with reference to FIGS. 1-4 and/or another module. Thus, the method 700 may provide for adaptive fault prediction analysis. It should be noted that the method 700 is just one implementation and that the operations of the method 700 may be rearranged, omitted, and/or otherwise modified such that other implementations are possible and contemplated.

In some examples, aspects from two or more of the methods 600 and 700 may be combined and/or separated. It should be noted that the methods 600 and 700 are just example implementations, and that the operations of the methods 600 and 700 may be rearranged and/or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to data security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A system comprising:
    a plurality of computing components;
    a hardware controller configured to:
        analyze one or more tolerance limits of a first computing component among the plurality of computing components;
        calculate a failure metric of the first computing component based at least in part on the analysis of the one or more tolerance limits of the first computing component;
        analyze sensor data from the first computing component in real time;
        determine that location of the first computing component relative to location of the second computing component satisfies a location threshold; and
        update the failure metric based at least in part on the analyzing of the sensor data and in part on how near the first computing component is located relative to a second computing component.

2. The system of claim 1, wherein the hardware controller is further configured to:

detect a failure of the second computing component among the plurality of computing components.

3. The system of claim 2, wherein the hardware controller is further configured to:
identify a location of the first computing component relative to a location of the second computing component.

4. The system of claim 3, wherein the hardware controller is further configured to:
determine that the first computing component is located adjacent to the second computing component and in response, update the failure metric to a predetermined amount allowed for failure in an adjacent component.

5. The system of claim 3, wherein the hardware controller is further configured to:
upon determining the first computing component is located directly adjacent to the second computing component, update the failure metric of the first computing component a maximum amount allowed for failure in an adjacent component.

6. The system of claim 2, wherein the hardware controller is further configured to:
update the failure metric of the first computing component by an amount determined based at least in part on a component type associated with the first computing component, a component type associated with the second computing component, or both.

7. The system of claim 1, wherein the one or more tolerance limits of the first computing component includes at least one of component age, lifetime utilization, accumulated operations, real-time component temperature, component temperature history, real-time component vibration, component vibration history, real-time component electrical current, history of component electrical current, real-time component electrical voltage, history of component electrical voltage, or any combination thereof.

8. The system of claim 1, wherein the sensor data of the first computing component includes at least one of an indication of an uncorrectable error, a command timeout, a read or write error of a solid state drive, a read or write error of non-volatile memory device, a reallocated sector count, a current pending sector count, an offline uncorrectable sector count, or any combination thereof.

9. The system of claim 1, wherein analysis of the one or more tolerance limits of the first computing component includes using at least one of machine learning, deep learning, analytics, or any combination thereof, to process the one or more tolerance limits of the first computing component.

10. The system of claim 1, wherein the first computing component includes at least one of a storage drive, a storage drive within a storage enclosure enclosing multiple storage drives, one or more main memory modules, one or more processors, or any combination thereof.

11. An apparatus comprising:
a hardware controller configured to:
analyze one or more tolerance limits of a first computing component among a plurality of computing components;
calculate a failure metric of the first computing component based at least in part on the analysis of the one or more tolerance limits of the first computing component;
analyze sensor data from the first computing component in real time;
determine that location of the first computing component relative to location of the second computing component satisfies a location threshold; and
update the failure metric based at least in part on the analyzing of the sensor data and in part on how near the first computing component is located relative to a second computing component;
detect a failure of the second computing component among the plurality of computing components.

12. The apparatus of claim 11, wherein the hardware controller is further configured to:
identify a location of the first computing component relative to a location of the second computing component.

13. The apparatus of claim 12, wherein the hardware controller is further configured to:
Determine that the first computing component is located adjacent to the second computing component and in response, update the failure metric to a predetermined amount allowed for failure in an adjacent component.

14. The apparatus of claim 12, wherein the hardware controller is further configured to:
upon determining the first computing component is located directly adjacent to the second computing component, update the failure metric of the first computing component a maximum amount allowed for failure in an adjacent component.

15. The apparatus of claim 11, wherein the hardware controller is further configured to:
update the failure metric of the first computing component by an amount determined based at least in part on a component type associated with the first computing component, a component type associated with the second computing component, or both.

16. The apparatus of claim 11, wherein the one or more tolerance limits of the first computing component includes at least one of component age, lifetime utilization, accumulated operations, real-time component temperature, component temperature history, real-time component vibration, component vibration history, real-time component electrical current, history of component electrical current, real-time component electrical voltage, history of component electrical voltage, or any combination thereof.

17. The apparatus of claim 11, wherein the sensor data of the first computing component includes at least one of an indication of an uncorrectable error, a command timeout, a read or write error of a solid state drive, a read or write error of non-volatile memory device, a reallocated sector count, a current pending sector count, an offline uncorrectable sector count, or any combination thereof.

18. The apparatus of claim 11, wherein analysis of the one or more tolerance limits of the first computing component includes using at least one of machine learning, deep learning, analytics, or any combination thereof to process the one or more tolerance limits of the first computing component.

19. A method of predicting failures of computing components within a computing system comprising:
analyzing one or more tolerance limits of a first computing component among a plurality of computing components in the computing system;
calculating a failure metric of the first computing component based at least in part on the analysis of the one or more tolerance limits of the first computing component;
analyzing sensor data from the first computing component in real time, the sensor data including at least one of an indication of an uncorrectable error, a command timeout, a reallocated sector count, a current pending sector count, an offline uncorrectable sector count, or any combination thereof;

determining that location of the first computing component relative to location of the second computing component satisfies a location threshold; and updating the failure metric based at least in part on the analyzing of the sensor data and in part on how near the first computing component is located relative to a second computing component.

20. The method of claim 19, comprising:

detecting a failure of the second computing component among the plurality of computing components.

* * * * *